United States Patent [19]

Christensen et al.

[11] Patent Number: 5,194,286
[45] Date of Patent: Mar. 16, 1993

[54] POLYBASIC ACID AMIDES AND THEIR USE AS DIGESTIVELY HYDROLYZABLE OIL SUBSTITUTES

[75] Inventors: Stephen B. Christensen; Attila G. Relenyi; Robert G. LaBarge; Bassam S. Nader, all of Midland, Mich.

[73] Assignee: The Dow Chemical Company, Midland, Mich.

[21] Appl. No.: 879,540

[22] Filed: May 4, 1992

Related U.S. Application Data

[63] Continuation of Ser. No. 671,242, Mar. 19, 1991, abandoned, which is a continuation-in-part of Ser. No. 464,814, Jan. 16, 1990, abandoned.

[51] Int. Cl.$^5$ .......................... A23D 5/00; C09E 5/00
[52] U.S. Cl. ..................................... 426/612; 554/37; 426/601
[58] Field of Search ................... 554/37; 426/612, 601

[56] References Cited

U.S. PATENT DOCUMENTS

| | | |
|---|---|---|
| 2,482,761 | 9/1949 | Goebel . |
| 2,793,219 | 5/1957 | Barrett et al. . |
| 2,793,220 | 5/1957 | Barrett et al. . |
| 2,955,121 | 10/1960 | Myers et al. . |
| 3,076,003 | 1/1963 | Myers et al. . |
| 3,100,784 | 8/1963 | Goebel . |
| 3,157,681 | 11/1964 | Fischer . |
| 3,412,039 | 11/1968 | Miller . |
| 3,422,124 | 1/1969 | Milks et al. . |
| 3,632,822 | 2/1969 | Conroy . |
| 3,732,263 | 5/1973 | Berman . |
| 4,005,195 | 1/1977 | Jandacek . |
| 4,734,287 | 3/1988 | Singer et al. . |
| 4,849,242 | 7/1989 | Kershner . |
| 5,063,075 | 11/1991 | Yarger et al. .................. 426/601 |

FOREIGN PATENT DOCUMENTS

| | | |
|---|---|---|
| 0233856 | 8/1987 | European Pat. Off. . |
| 0236288 | 9/1987 | European Pat. Off. . |
| 0303523 | 2/1989 | European Pat. Off. . |

OTHER PUBLICATIONS

R. G. LaBarge, "The Search for a Low-Caloric Oil," Food Technology, Jan. 1988.
F. H. Mattson and G. A. Nolen, "Absorbability by Rats of Compounds Containing from One to Eight Ester Groups," Journal of Nutrition, vol. 102, pp. 1171-1175.
D. J. Hamm, Preparation & Evaluation of Trialkoxytricarballylate, Trialkoxycitrate, Trialoxyglycerylether, Jojoba Oil & Sucrose Polyester as Low Calories Replacements of Edible Fat & Oils, Journ. of Food Science, vol. 49, p. 419, 1984.
J. C. Cowan, "Dimer Acids," JAOCS, vol. 39, pp. 534-545 (1962).
M. Dymicky, E. F. Mellon, and J. Naghski, "A General, Highly Efficient Azeotropic Method of Esterification of Amino Acids," Analytical Biochemistry, vol. 41, pp. 487-491 (1971).
Organic Syntheses, vol. 1, pp. 310-312 (1941).
R. Danieli, G. Martelli, G. Spunta, and S. Rossini, "New Synthesis of trans,trans-2-. . . ", J. Org. Chem., vol. 48, pp. 123-125 (1983).
N. Buu-Hoi, M. Welsch, G. Dechamps, H. Le Bihan, F. Binon, and N. Xuong, "Some New Tuberculostatic Thiosemicarbazones," J. Org. Chem., vol. 18, pp. 121-123.
C. Penney, P. Shah, and S. Landi, "A Simple Method for the Synthesis of Long-Chain Alkyl Esters of Amino Acids," J. Org. Chem., vol. 50, pp. 1457-1459 (1985).
"Dimer Acids," Encyclopedia of Chemical Technology, vol. 7, pp. 768 et seq., 3rd Ed., 1979.

*Primary Examiner*—Nicky Chan

[57] ABSTRACT

This invention relates to digestively hydrolyzable low calorie edible oil substitutes. These compounds have the organoleptic properties of normal triglycerides fats, but are lower in available calories. Specifically, the invention is directed to a composition of matter. The compositions are in one embodiment amides of dimer acids or trimer acids made from glycinates. The compounds are in part directed to amides based on the amino acid esters of the amino acid glycine. The utility of these compounds is in a low caloric edible oil.

11 Claims, No Drawings

POLYBASIC ACID AMIDES AND THEIR USE AS DIGESTIVELY HYDROLYZABLE OIL SUBSTITUTES

CROSS-REFERENCE TO RELATED APPLICATION

This is a continuation Ser. No. 671,242, filed Mar. 19, 1991, now abandoned, which is a continuation-in-part of U.S. patent application Ser. No. 464,814, filed Jan. 16, 1990.

FIELD OF THE INVENTION

This invention relates to a new compound comprising amides. Further, it relates to the use of these compounds as oil substitutes.

BACKGROUND OF THE INVENTION

Recently, there has been interest in edible oils substitutes to effect caloric reduction. Initial approach involved dilution with air or water. But that had the disadvantage of a reduction of both the perceived quality and richness of edible compounds and food compositions.

More recently, U.S. Pat. No. 4,734,287 teaches a suspension of tiny spheres of dairy protein to mimic texture of fat in certain foods such as ice cream or salad dressing. Because this suspension has about 1.3 calories/g, compared with 9 calories/g for typical fat, a considerable caloric reduction is possible. Unfortunately, this material cannot be fried or baked and therefore cannot be used as a total fat replacement.

A more attractive and versatile approach to this problem is to reduce the fat-related caloric intake by a modification of the fat to reduce or prevent absorption of fat-derived calories. According to Mattson and Nolen, *J. Nutr.*, 102, 1171 (1972), "the absorbability of a fat is determined by two processes, hydrolysis in the lumen of the intestinal tract and the subsequent absorption of the digestion products." Without this hydrolysis, the fat would not be in the form required for intestinal absorption and would pass through the body unchanged. If nothing is absorbed, the material would be noncaloric.

The "Olestra" brand of sucrose polyester is a known material that does not chemically change in the body. "Olestra", along with other similar compounds, is reported to have satisfactory organoleptic properties for use in food, but is not absorbed like fat due to a low rate of intestinal hydrolysis. Hence, it has a very low caloric availability.

Unfortunately, ingestion of even moderate amounts of this type of material can result in an undesired laxative effect, namely, leakage of the liquid material through the anal sphincter. See *J. Food Science.* 49, 419-28 (1984). This anal leakage problem seems to be the inevitable result of the ingestion of an oily material with limited digestibility. Thus, a successful fat replacement must avoid this laxative effect.

U.S. Pat. No. 4,005,195 teaches another way of avoiding the laxative effect of "Olestra" by using solid fatty acids and solid fatty acid esters as anti-anal leakage additives. Unfortunately, this solution has the drawback of giving the food composition a "waxy" feel in the mouth, due to the high solids content of the mixture.

Additionally, European Patent Application No. 87/870,021.0, Publication No. 236,288 teaches another way to avoid the laxative effect by preparing a form of "Olestra" with a non-Newtonian pseudoplastic rheology at body temperature. The special rheology of this material, high viscosity during excretion, but low viscosity during ingestion, is said to prevent anal leakage without adversely affecting the feel of the product in the mouth. Yet, a second European Patent Application, Publication No. 233,856, teaches that a better tasting low calorie fat material can be formulated by mixing this pseudoplastic form of "Olestra" with a normal liquid triglyceride. According to this disclosure, the resulting mixture does not taste as "waxy in the mouth" as the special fat substitute alone. However, by mixing a normal liquid triglyceride with the pseudoplastic form of Olestra, it is not as low in calories.

The preceding references are hereby incorporated by reference.

What is needed in this area is a low calorie, edible oil substitute that has the physical properties and pleasing feel in the mouth of a normal liquid triglyceride oil, but that does not promote a laxative effect. This substitute has now been discovered.

SUMMARY OF THE INVENTION

This invention relates to amides. These compounds are digestively hydrolyzable. They provide an edible oil substitute which reduces the available calories in a food composition and avoids the aforementioned disadvantages in the background art.

This invention further relates to a digestively hydrolyzable compound comprising the formula:

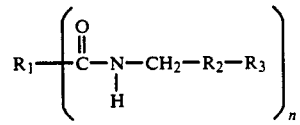

wherein $R_1$ is a hydrocarbon radical derived from a polybasic acid having the formula

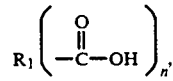

where n is 2 or 3, $R_2$ is

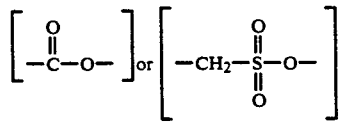

and $R_3$ is a $C_1$ to $C_{22}$ straight or branched chain alkyl radical, a monovalent moiety.

This invention relates to a low calorie edible oil comprising (a) a food oil and (b)

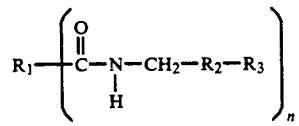

where $R_1$, $R_2$, $R_3$ and n are as defined hereinbefore.

DETAILED DESCRIPTION OF THE INVENTION

This invention is directed to a composition of matter. This invention is also directed to a use of that composition.

The polybasic acid is preferably a dimer or trimer acid. Dimer and trimer acids are described in *Encyclopedia of Chemical Technology*, vol. 7, p. 768 et seq., 3rd Ed. (1979), hereby incorporated by reference. The $R_1$ group in the polybasic acid should have a sum of the atomic weights of the atoms present in this group of greater than 200. Preferably the sum of the atomic weights of all atoms present in the $R_1$ group is greater than 200 but not more than 3000. For purposes of illustration, when a polybasic acid where n equals 2 has a molecular weight of 290, the sum of the atomic weight of all atoms present in $R_1$ is about 200. The dimer acid, that is an acid where n is 2 and which is derived from a $C_{18}$ fatty acid, is the preferred material from which the invented compositions are derived.

The compositions are preferably amides of dimer acids or trimer acids made from glycinates. The compounds which comprise this invention are specifically directed to amides based on the amino acid esters of amino acids, for example, glycine, and taurine. The utility of these compounds is in a low caloric edible oil.

The polybasic acid amide (i.e., preferably a dimer acid amide or trimer acid amide) used in this invention is derived from polybasic acids and glycine esters.

This polybasic acid is conveniently produced by the thermal polymerization of unsaturated $C_{18}$ fatty acids by a variety of methods that are well known in the art. See, *JAOCS*, 39, 534–45 (1962) and references therein. See also, U.S. Pat. Nos. 3,632,822; 3,100,784; 2,793,220; 3,732,263; 3,422,124; 3,412,039; 2,955,121; 3,157,681; 2,482,761; 2,793,219 and 3,076,003. Optionally, fatty acids other than $C_{18}$ can be employed, but are not as readily available commercially. The preceding references are incorporated by reference.

If the product of the polymerization is formed by the union of two molecules of fatty acid, the material is commonly known as "dimer acid" and typically has an approximate molecular weight of 560 for the preferred fatty acid which has 18 carbon atoms. If the product of this polymerization is derived by the union of three molecules of fatty acid, the material is commonly known as "trimer acid" and typically has an approximate molecular weight of 840 when made from a $C_{18}$ fatty acid. The product from any one polymerization process typically contains a mixture of unreacted monomeric fatty acids, dimer acids, and trimer acids. The exact ratio of these products depends on the process, the feed stock, and on the purification steps (if any) that are used.

In the preferred embodiment of this invention, the polybasic acid comprises essentially a mixture of dimer and trimer acids, with little monomeric fatty acid. This is because the molecular weights of the dimer and trimer acids are large enough that they are substantially not absorbed in the body by the intestine. To the extent that they are not absorbed, the dimer and trimer acids are essentially noncaloric.

The monomeric fatty acids, however, are absorbed by the intestine, and contribute significantly to the caloric content of the food composition. For this reason, the preferred polybasic acid of this invention contains less than 5 percent and more preferably less than 1 percent of monomeric fatty acid.

The ratio of dimer acid to trimer acid in the polybasic acid can be varied according to the desired viscosity of the product and according to the polymerization process used. In general, a higher proportion of trimer acid gives a more viscous product. Suitable ratios are those which have a non-laxative oil replacement effect. Suitable feedstocks for this invention include, but are not limited to oleic acid and linoleic acid and the natural oils containing same.

The exact structures of the dimer acids and trimer acids of this invention will vary with the polymerization process used and with the feedstock. The dimer and trimer acids each comprise a large number of structural isomers. This large number of isomers is responsible for the fact that these high molecular weight polybasic acids are liquids and not solids. Typical values for the Brookfield viscosity of the polybasic acid of this invention will vary from (but not limited to) a value of about 2,000 cPs (at 100° F.) for a high dimer mixture, to a value of as much as 22,000 cPs (at 100° F.) for a high trimer mixture.

The alkyl radicals of this invention, $R_3$, are derived from any straight chain or branched, saturated or unsaturated, alcohols with from 1 to 22 carbon atoms, preferably 2 to 10 carbon atoms. These alcohols may be released into the body by the processes of intestinal digestion upon the polybasic acid ester of this invention. Because these alcohols are of low molecular weight, they are absorbed into the body and contribute calories in the usual way. To keep the caloric availability as low as possible, the molecular weight of the alcohol portion should therefore be as small as possible. The preferred alcohol of this invention is ethanol.

The low calorie edible oil replacement of this invention is a glycinate (glycine ester) amide form. Oils are taught in U.S. Pat. No. 4,849,242, incorporated by reference. The methods for preparing such esters of glycine are known. See, *Anal. Biochem.*, 41. 487–491 (1971): *Org. Syn.*, 1, 310–312; *J. Org. Chem.*, 48. 123–125: *J. Org. Chem.*, 18. 121–123: *J. Org. Chem.*, 50, 1457–1459, and references therein all hereby incorporated by reference. Their use as a low calorie edible oil has not been disclosed.

The polybasic acid glycinate amides used in the preferred embodiment of this invention are ethyl glycinate amides of mixtures of dimer and trimer acid.

The polybasic acid amides of this invention have reduced caloric availability compared with normal triglyceride oils by virtue of the noncaloric nature of the polybasic acid portion of the amide. The polybasic acid amides have the property of being at least partly hydrolyzed into their component parts of simple alcohols, amino acids, and polybasic acids. These polybasic acids are of sufficient molecular weight that they are substantially not absorbed in the body, and are thus noncaloric. Only the alcohol and amino acid portions contribute calories to the food.

A carboxylic acid derivative is used to make the subject compound. It may be a multicarboxylic acid: or a monocarboxylic acid. It does not affect the process because each individual carboxylic acid group is transformed separately. A carboxylic acid is preferably activated by converting it to some type of reactive intermediate. One such intermediate is an acid chloride, although others are known. The reactive intermediate is then treated with the amino acid derivative that is to be used. This derivative is formed from the amino acid used and the alcohol that contains the alkyl radical used by standard methods of esterification that are commonly known in the art. One possible amino acid derivative is a glycine ester. One possible ester of that would be the ethyl ester. Ethylglycinate can be used as the amino acid derivative. If you treat ethylglycinate and the reactive intermediate together in the presence of a base or acid acceptor, the desired compound is produced which will be an ethylglycinate amide of the original carboxylic acid.

Dimer or trimer acids with a molecular weight in the range from 560 to 850 are preferred as the polybasic acid. The preferred amino acid derivative is the glycine derivative, although taurine is also operable. The distal carboxylate group of the amino acid also is functionalized as an ester. That ester could be made from a variety of alcohols. It can have $C_1$, $C_2$, $C_3$, $C_4$, on up to whatever lengths wanted. But that material will likely be absorbed in the body. So it is preferable to have something that is low molecular weight for calorie reasons and also is tolerated physiologically. The ethanol is preferred as the alcohol from which the ester is derived.

In the preferred embodiment of this invention, the dimer or trimer acid is the backbone, and the amino acid derivative is ethylglycinate. Its use as a low calorie food is demonstrated by feeding it to rats at 2½ percent level and is demonstrated in that the rats thrive on the diet. There is no gross adverse affects evidenced over a two-week period. Upon the collection of feces from the rats, it is demonstrated that greater than 85 percent of the weight of the noncaloric food oil fed them is recovered. This recovery demonstrates that the material is a low calorie food oil.

As much of the oil may be used in a food product as is suitable to achieve a desired reduction in calories. If all of the available food oil in the product were replaced with the low calorie food oil, the caloric availability could be reduced by only as much as the amount of the food oil contained in the food. It is not necessary to reduce it by that much. A mixture of the food oil and the digestively hydrolyzable composition of this invention could be used to achieve the desired result in any ratio having the desired caloric content. Typically, calories are reduced by ⅓ or more for a low calorie product.

Other characteristics of the process are conventional to those skilled in the art without undue experimentation.

EXAMPLES

The invention will now be described with respect to specific examples which are not considered to limit the invention.

EXAMPLE 1

Into a six-liter cylindrical glass reactor equipped with overhead stirrer and jacketed cooling are placed 597.84 g of a polybasic acid mixture comprised of 4 percent monobasic acid, 94 percent dimer acid, and 2 percent trimer acid and 600 ml of tetrahydrofuran. Next, 1,1'-carbonyldiimidazole (345.76 g, 2 eq.) is added portionately under nitrogen. Then 600 ml of tetrahydrofuran (THF) is used to wash the reagent into the reaction mixture from the sides of the reactor. Gas evolution (carbon dioxide) is observed upon addition of the 1,1'-carbonyldiimidazole. The resultant slightly yellow solution is stirred for about 30 minutes.

Into a 2-liter reactor are placed 295.96 g (2 eq.) of ethyl ester glycine hydrochloride (formed from glycine and ethanol) and 600 ml of chloroform. Into an addition funnel are placed 215.42 g (2 eq.) of triethylamine and then added dropwise over five minutes to give a thick slurry. After the addition of triethylamine, chloroform (600 ml) is added to thin out the slurry and facilitate stirring with the overhead mechanical stirrer.

The slurry is drained from the reactor and added portionately as a chloroform (400 ml) slurry to the reaction mixture now containing the carbonyl imidazole of the dimer acid. A 5° to 20° temperature rise is observed as additional insoluble material is formed. The reaction mixture is stirred for 45 minutes.

The reaction mixture is quenched with 500–1800 ml of saturated sodium chloride solution. The phases are permitted to separate over two days time. The organic layer is washed twice with 1000 ml portions of dilute (about 10 percent) aqueous hydrochloric acid. The organic layer is dried over magnesium sulfate. The dried organic solvent is removed on a Buchi rotovap, first with aspirator vacuum, then by diffusion pump vacuum (2–5 mm Hg) to yield an almost colorless oil. The reaction yield is 90.5 percent (704.11 g).

EXAMPLE 2

This example relates to preparation of tris-amide of trimer acid from ethyl ester glycine hydrochloride.

Into a 6-liter reactor are placed 512.78 g of a polybasic acid mixture comprised of 60 percent trimer acid and 40 percent dimer acid and 600 ml of tetrahydrofuran. 1,1'-Carbonyldiimidazole (294.41 g, 3 eq.) are added using 600 ml of tetrahydrofuran to wash the reagent into the reaction mixture and from the sides of the reactor. Gas evolution (carbon dioxide) is observed upon addition. The solution is stirred for 30 minutes.

Into a 2-liter reactor are placed 254.62 g (3 eq.) of ethyl ester glycine hydrochloride (formed from glycine and ethanol) and 600 ml of chloroform. Into an addition funnel are placed 185.10 g (3 eq.) of triethylamine. Triethylamine is added over 5 minutes which created a thick slurry.

The slurry is drained from the reactor and added to the reaction mixture. Chloroform (600 ml) is used to wash the slurry into the reaction mixture. An exotherm and insoluble material present in the reaction mixture are observed. The reaction mixture is stirred for 90 minutes.

The reaction mixture is quenched with 2000 ml of saturated sodium chloride solution. The phases are permitted to separate. The organic layer is washed once with 2,000 ml of acidic aqueous solution (hydrochloric acid and water). Charcoal is added to the organic layer which is then run through a basic alumina bed. The organic layer is dried over magnesium sulfate. The solvent is removed on a Buchi rotovap, first with aspirator vacuum, then by diffusion pump vacuum (−2.5 mm Hg) to yield a dark orange oil. The reaction yield is 81.0 percent (540.2 g).

EXAMPLE 3

Feeding experiments are conducted using the following liquid dimer and trimer acid amides on rats.

The material is prepared by conventional chemical synthesis, purification routes and sources for the starting material acids. The feeding procedure is evident from the following information as are the results.

|  | Percent Oil Recovery*[1] |
|---|---|
| Dimer acid glycinamide | 94 |
| Trimer acid glycinamide | 99 |

*Normalized for glycine absorption.
[1] fed at 2.5 percent level.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A digestively hydrolyzable compound corresponding to the formula:

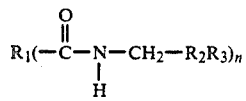

where the compound is derived from a polybasic acid of the formula

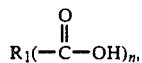

wherein $R_1$ is a hydrocarbon radical, the sum of the atomic weights of all atoms in $R_1$ being greater than 200, n is 2 or 3, and $R_2$ is

and $R_3$ is a $C_1$ to $C_{22}$ straight or branched chain alkyl radical.

2. The compound of claim 1, wherein the compound is a liquid at 20° C. and atmospheric pressure.

3. The compound of claim 1, wherein $R_3$ is ethyl.

4. The compound of claim 1, wherein $R_1$ is the hydrocarbon radical portion of a dimer or trimer acid having a molecular weight in the range from 560 to 850.

5. The compound of claim 1, wherein the compound is an amide based on an ester of glycine.

6. The compound of claim 1, wherein the compound is a solid at 20° C. and atmospheric pressure.

7. The compound of claim 1, wherein $R_2$ is

and $R_3$ is $-C_2H_5$.

8. A low calorie edible oil composition comprising:
(a) a food oil and (b) a compound of the formula

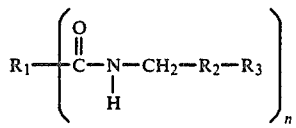

where $R_1$ is derived from a polybasic acid having the formula

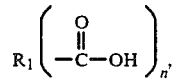

the sum of the atomic weights of all atoms in $R_1$ being greater than 200, n is 2 or 3, $R_2$ is

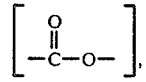

and $R_3$ is a $C_1$ to $C_{22}$ straight or branched chain alkyl radical which is digestively hydrolyzable.

9. The low caloric oil as described in claim 8, wherein $R_2$ is

and $R_1$ is derived from a dimer or trimer acid having a molecular weight in the range from 560 to 850.

10. The low calorie oil as described in claim 9, wherein $R_3$ is ethyl.

11. The low calorie oil as described in claim 10, wherein $R_1$ is derived from a dimer acid and n is 2.